US010165470B2

(12) United States Patent
Azizi et al.

(10) Patent No.: US 10,165,470 B2
(45) Date of Patent: Dec. 25, 2018

(54) HIGH-EFFICIENCY (HE) STATION AND METHOD FOR CONFIGURING HE PACKETS WITH LONG AND SHORT PREAMBLE FORMATS

(71) Applicant: Intel IP Corporation, Santa Clara, CA (US)

(72) Inventors: Shahrnaz Azizi, Cupertino, CA (US); Robert J. Stacey, Portland, OR (US); Thomas J. Kenney, Portland, OR (US); Eldad Perahia, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 252 days.

(21) Appl. No.: 14/579,700

(22) Filed: Dec. 22, 2014

(65) Prior Publication Data

US 2016/0127948 A1     May 5, 2016

Related U.S. Application Data

(60) Provisional application No. 62/075,381, filed on Nov. 5, 2014.

(51) Int. Cl.
*H04W 28/18* (2009.01)
*H04L 27/26* (2006.01)
*H04W 84/12* (2009.01)

(52) U.S. Cl.
CPC ......... *H04W 28/18* (2013.01); *H04L 27/2602* (2013.01); *H04L 27/2613* (2013.01); *H04W 84/12* (2013.01)

(58) Field of Classification Search
CPC .............................. H04W 28/18; H04W 84/12
(Continued)

(56) References Cited

U.S. PATENT DOCUMENTS

2007/0104089 A1   5/2007  Mujtaba
2010/0107042 A1*  4/2010  Sawai ................. H04L 27/2675
                                                 714/799
(Continued)

FOREIGN PATENT DOCUMENTS

CN       106233777 A    12/2016
JP       2013511221 A    3/2013
(Continued)

OTHER PUBLICATIONS

"International Application Serial No. PCT/US2015/054191, International Search Report dated Jan. 22, 2016", 3 pgs.
(Continued)

*Primary Examiner* — Chi Tang P Cheng
(74) *Attorney, Agent, or Firm* — Schwegman Lundberg & Woessner, P.A.

(57) ABSTRACT

Apparatuses, methods, and computer readable media are disclosed. A HE station may include circuitry. The circuitry may be configured to: generate a HE packet with a short preamble format or a long preamble format, wherein the HE packet comprises one or more legacy signal (L-SIG) fields followed by one or more HE signal fields (HE-SIG) and an HE long-training field (HE-LTF); and configure the HE packet to indicate whether the HE packet is configured with the short preamble format or the long preamble format. The HE packet may be configured with the short preamble format or the long preamble format based on one from the following group: a symbol after the L-SIG fields, a L-SIG polarity of a repeated L-SIG, a number of times the L-SIG fields is repeated, or a length field of one of the one or more L-SIG fields.

13 Claims, 5 Drawing Sheets

(58) Field of Classification Search
USPC .......................................................... 370/338
See application file for complete search history.

(56) References Cited

U.S. PATENT DOCUMENTS

| | | | |
|---|---|---|---|
| 2012/0269124 A1 | 10/2012 | Porat | |
| 2013/0182593 A1* | 7/2013 | Zhang | H04L 29/02 370/252 |
| 2013/0315342 A1 | 11/2013 | Um et al. | |
| 2014/0307653 A1 | 10/2014 | Liu et al. | |
| 2016/0065467 A1* | 3/2016 | Wu | H04L 65/60 370/392 |
| 2016/0119453 A1* | 4/2016 | Tian | H04L 5/04 370/338 |

FOREIGN PATENT DOCUMENTS

| | | |
|---|---|---|
| TW | 201618501 A | 5/2016 |
| TW | I611677 B | 1/2018 |
| WO | WO-2014130702 A1 | 8/2014 |
| WO | WO-2014171788 A1 | 10/2014 |
| WO | WO-2014172198 A1 | 10/2014 |
| WO | WO-2016073115 A1 | 5/2016 |

OTHER PUBLICATIONS

"International Application Serial No. PCT/US2015/054191, Written Opinion dated Jan. 22, 2016", 9 pgs.

"Taiwanese Application Serial No. 104132535, Office Action dated Dec. 29, 2016", W/English Claims.

"Taiwanese Application Serial No. 104132535, Response filed Jun. 21, 2017 to Office Action dated Dec. 29, 2016", (W/ English Claims), 51 pgs.

"European Application Serial No. 15857986.2, Extended European Search Report dated May 18, 2018", 7 pgs.

"Indian Application Serial No. 201747013307, Voluntary Amendment filed May 28, 2018", W/ English Claims, 12 pgs.

"Japanese Application Serial No. 2017-521557, Office Action dated Feb. 27, 2018", w/ English translation, 6 pgs.

"Japanese Application Serial No. 2017-521557, Response filed May 25, 2018 to Office Action dated Feb. 27, 2018", W/ English Claims, 15 pgs.

"Korean Application Serial No. 10-2017-7012320, Voluntary Amendment filed May 21, 2018", W English Claims, 20 pgs.

"Korean Application Serial No. 10-2017-7012320, Notice of Preliminary Rejection dated Jul. 19, 2018", W English Translation, 6 pgs.

* cited by examiner

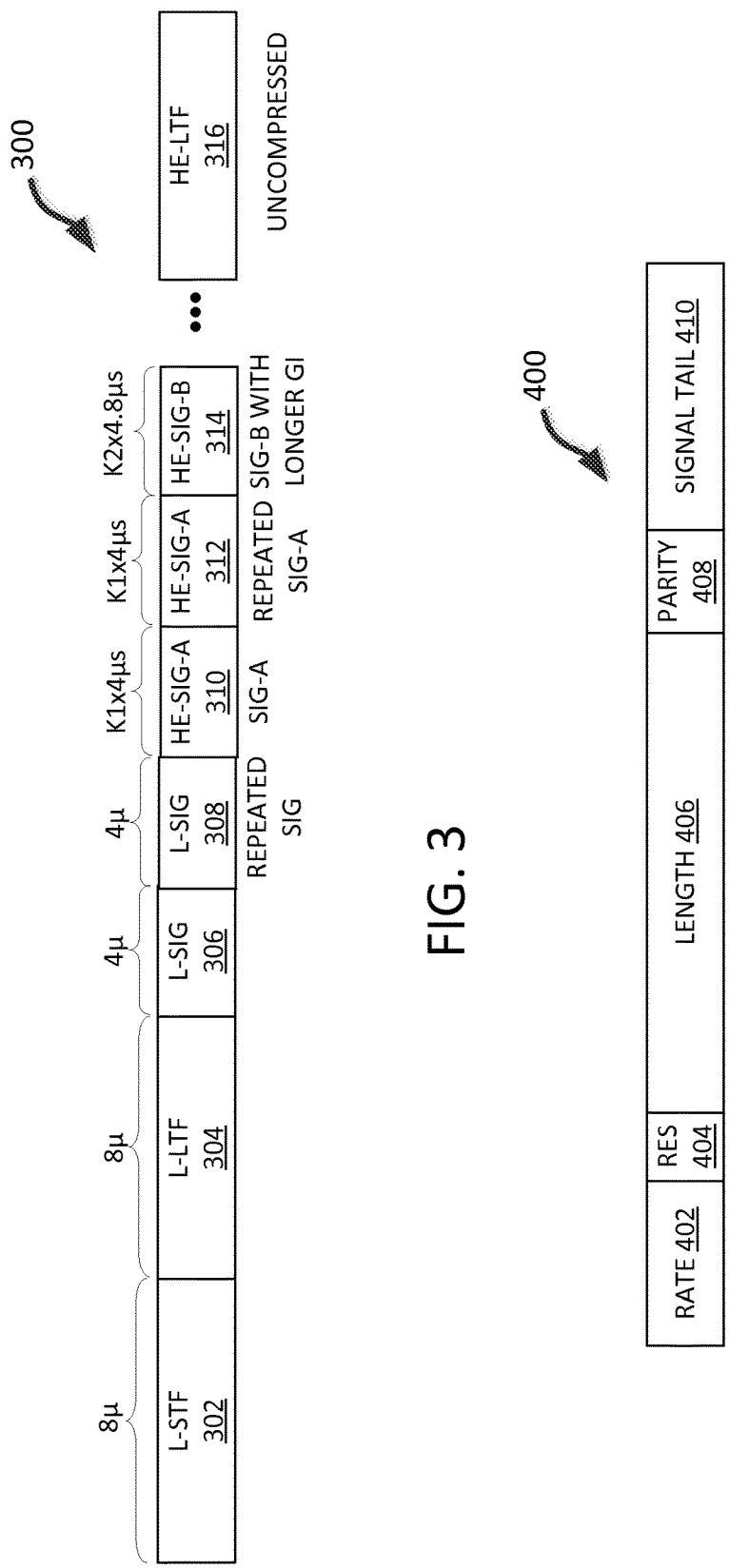

HIGH-EFFICIENCY (HE) STATION AND METHOD FOR CONFIGURING HE PACKETS WITH LONG AND SHORT PREAMBLE FORMATS

PRIORITY CLAIM

This application claims the benefit of priority under 35 USC 119(e) to U.S. Provisional Patent Application Ser. No. 62/075,381, filed Nov. 5, 2014, which is incorporated herein by reference in its entirety.

TECHNICAL FIELD

Embodiments pertain to wireless networks. Some embodiments relate to high efficiency (HE) wireless local area networks (WLANs) including networks operating in accordance with the Institute of Electronic and Electrical Engineers (IEEE) 802.11 family of standards, such as the IEEE 802.11a/g/n/ac standard or the IEEE 802.11ax standard. Some embodiments relate to using different size preambles.

BACKGROUND

Embodiments pertain to wireless networks. Often preambles and other non-data portions of packets are transmitted between wireless devices in order to enable the wireless devices to properly receive and interpret received packets. However, the preambles and other non-data portions detract from efficiency of the network since they are not directly conveying data between the wireless devices.

Moreover, often more than one standard may be in use in a WLAN. For example, IEEE 802.11ax, referred to as High Efficiency wireless local-area networks (WLAN) (HEW) may need to be used with legacy versions of 802.11.

Therefore, there are general needs in the art to improve the operation and/or efficiency of communication between wireless devices.

BRIEF DESCRIPTION OF THE DRAWINGS

The present disclosure is illustrated by way of example and not limitation in the figures of the accompanying drawings, in which like references indicate similar elements and in which:

FIG. 3 illustrates a long preamble format in accordance with some embodiments;

FIG. 4 illustrates a legacy signal field (L-SIG) in accordance with some embodiments;

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
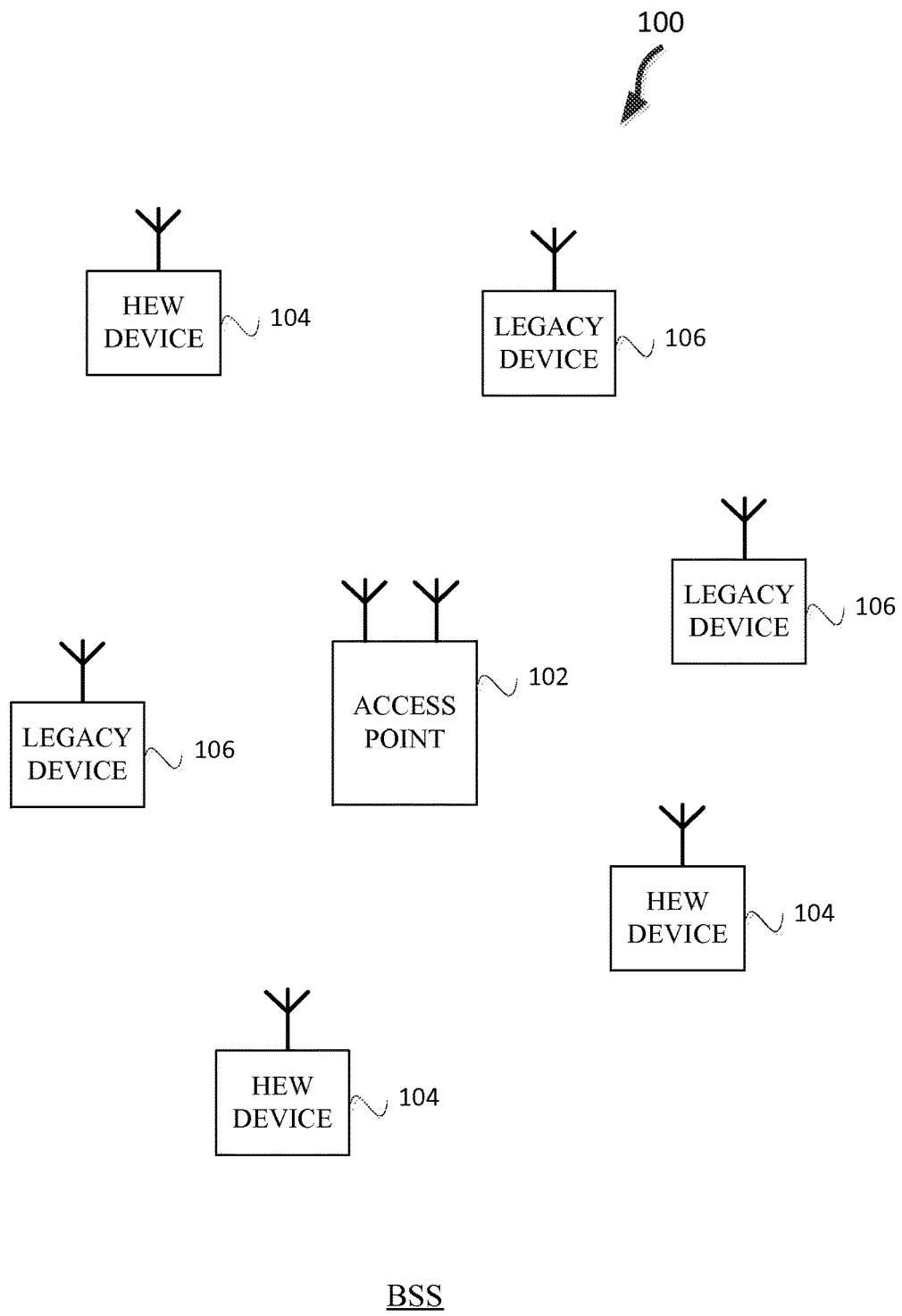
FIG. 1 illustrates a wireless network, in accordance with some embodiments.

FIG. 1 illustrates a wireless network, in accordance with some embodiments. The wireless network may comprise a basic service set (BSS) 100 that may include an access point (AP) 102, a plurality of HEW devices 104, and a plurality of legacy devices 106.

The AP 102 may be an access point (AP) using the Institute of Electrical and Electronics Engineers (IEEE) 802.11 to transmit and receive. The AP 102 may be a base station. The AP 102 may use other communications protocols as well as the 802.11 protocol as described below. The 802.11 protocol may be 802.11ax. The 802.11 protocol may include using orthogonal frequency division multiple access (OFDMA). The 802.11 may include using multi-user (MU) multiple-input and multiple-output (MIMO)(MU-MIMO), space division multiplexing (SDM), and/or space division multiple access (SDMA). The HEW devices 104 may operate in accordance with 802.11ax and/or DensiFi. The legacy devices 106 may operate in accordance in accordance with one or more of 802.11a/g/n/ac, or another legacy wireless communication standard.

The HEW devices 104 may be wireless transmit and receive devices such as cellular telephones, handheld wireless devices, wireless glasses, wireless watches, wireless personal devices, tablets, or other devices that may be transmitting and receiving using the 802.11 protocol such as 802.11ax or another wireless protocol.

The BSS 100 may operate on a primary channel and one or more secondary channels or sub-channels. The BSS 100 may include one or more APs 102. In accordance with embodiments, the AP 102 may communicate with one or more of the HEW devices 104 on one or more of the secondary channels or sub-channels or the primary channel. In example embodiments, the AP 102 communicates with the legacy devices 106 on the primary channel. In example embodiments, the AP 102 may be configured to communicate concurrently with one or more of the HEW devices 104 on one or more of the secondary channels and a legacy device 106 utilizing only the primary channel and not utilizing any of the secondary channels.

The AP 102 may communicate with legacy devices 106 in accordance with legacy IEEE 802.11 communication techniques. In example embodiments, the AP 102 may also be configured to communicate with HEW devices 104 in accordance with legacy IEEE 802.11 communication techniques. Legacy IEEE 802.11 communication techniques may refer to any IEEE 802.11 communication technique prior to IEEE 802.11ax.

In some embodiments, a HEW frame may be configurable to have the same bandwidth, and the bandwidth may be one of 20 MHz, 40 MHz, 80 MHz, or 160 MHz contiguous bandwidths or an 80+80 MHz (160 MHz) non-contiguous bandwidth. In some embodiments, a 320 MHz contiguous bandwidth may be used. In some embodiments, bandwidths of 1 MHz, 1.25 MHz, 2.03125 MHz, 2.5 MHz, 5 MHz and 10 MHz or a combination thereof may also be used. In these embodiments, an HEW frame may be configured for transmitting a number of spatial streams In other embodiments, the AP 102, HEW device 104, and/or legacy device 106 may implement additional or different technologies such as code division multiple-access (CDMA) 2000, CDMA2000 1x, CDMA2000 EV-DO, Interim Standard 2000 (IS-2000), Interim Standard 95 (IS- 95), Interim Standard 856 (IS-856), Global System for Mobile communications (GSM), Long-Term Evolution (LTE), a standard from the 3 Generation Partnership Project (3GPP), Enhanced Data rates for GSM Evolution (EDGE), GSM EDGE (GERAN), IEEE 802.16 (i.e., Worldwide Interoperability for Microwave Access (WiMAX)), WiFi®, BlueTooth®, BlueTooth® Low Energy (BLE), 802.15.4, neighbor aware networking (NAN) program, Near-field communication (NFC), and/or a wireless personal area network (WPAN) wireless technology.

In an OFDMA system such as 802.11ax, an associated HEW device 104 may operate on any 20 MHz sub-channel of the BSS 100 (that can operate, for example, at 80 MHz). In example embodiments, an AP 102, HEW devices 104, and legacy devices 106 use carrier sense multiple access/collision avoidance (CSMA/CA). In some embodiments, the media access control (MAC) layer 706 (see FIG. 7) controls access to the wireless media.

In example embodiments, an AP 102, HEW devices 104, and legacy devices 106 perform carrier sensing and can detect whether or not the channel is free. For example, an AP 102, HEW device 104, or legacy device 106 may use clear channel assessment (CCA), which may include a determination as to whether the channel is clear based on a Decibel-milliwatts (dBm) level of reception. In example embodiments, the physical layer (PHY) 704 is configured to determine a CCA for an AP 102, HEW devices 104, and legacy devices 106.

After determining that the channel is free, an AP 102, HEW device 104, and legacy devices 106 defer their attempt to access the channel during a back-off period to avoid collisions. In example embodiments, an AP 102, HEW device 104, and legacy devices 106 determine the back-off period by first waiting a specific period of time and then adding a random back-off time, which, in some embodiments, is chosen uniformly between 0 and a current contention window (CS) size. A period of time may also be called a duration.

In example embodiments, an AP 102, HEW devices 104, legacy devices 106, access the channel in different ways. For example, in accordance with some IEEE 802.11ax embodiments, an AP 102 may operate as a master station which may be arranged to contend for a wireless medium (e.g., during a contention period) to receive exclusive control of the medium for an HEW control period (i.e., a transmission opportunity (TXOP)). The AP 102 may transmit an HEW master-sync transmission at the beginning of the HEW control period. During the HEW control period, HEW devices 104 may communicate with the AP 102 in accordance with a non-contention based multiple access technique. This is unlike conventional Wi-Fi communications in which legacy devices 106 and, optionally, HEW devices 104 communicate in accordance with a contention-based communication technique, rather than a non-contention multiple access technique. During the HEW control period, the AP 102 may communicate with HEW devices 104 using one or more HEW frames. During the HEW control period, legacy devices 106 refrain from communicating. In some embodiments, the master-sync transmission may be referred to as an HEW control and schedule transmission.

In some embodiments, the multiple-access technique used during the HEW control period may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a SDMA technique or uplink MU-MIMO (UL MU-MMIO).

The AP 102 may also communicate with legacy devices 106 in accordance with legacy IEEE 802.11 communication techniques. In some embodiments, the master station, which may be the AP 102, may also be configured to communicate with HEW stations outside the HEW control period in accordance with legacy IEEE 802.11 communication techniques, although this is not a requirement.

In example embodiments, the AP 102 and/or HEW device are configured to perform one or more of the functions and/or methods described herein in conjunction with FIGS. 2 through 6 such as configuring, transmitting, receiving, and interpreting HE packets with either a long preamble format 200 or a short preamble format 300.

Figure 2:
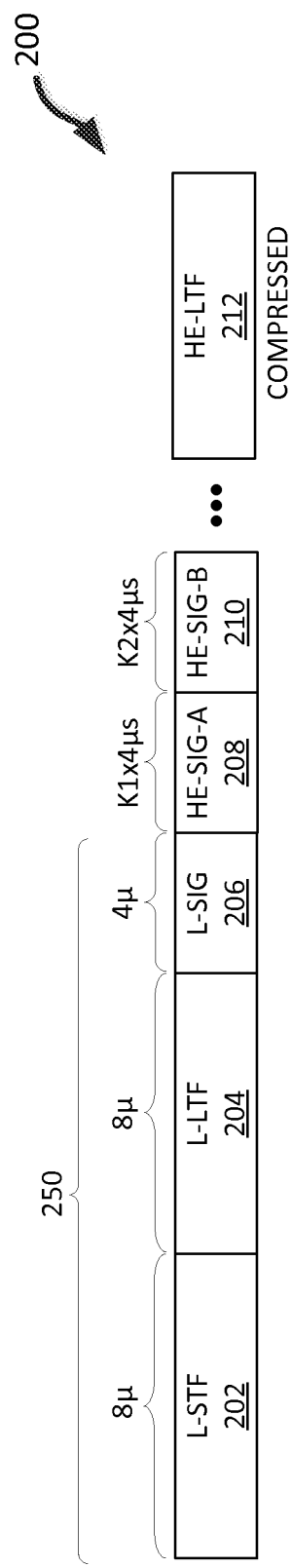
FIG. 2 illustrates a short preamble format in accordance with some embodiments.

FIG. 2 illustrates a short preamble format 200 in accordance with some embodiments. The short preamble format 200 may include a legacy short training field (L-STF) 202, legacy long training field (L-LTF) 204, legacy signal field (L-SIG) 206, high-efficiency signal-A field (HE-SIG-A) 208, HE-SIG-B field 210, and high-efficiency long training field (HE-LTF) 212.

The L-STF field 202 may be the same or similar as a legacy STF used by legacy device 106 such as 802.11a. The L-STF field 202 may comprise symbols that may be used by a HEW device 104 and a legacy devices 106 to determine that an 802.11 frame is about to start. The L-STF field 202 may last 8 microseconds (8μ). The L-LTF field 204 may be the same or similar as a legacy L-LTF field 204 such as is used in 802.11a.

The L-SIG field 206 may include a length field and duration field that are the same as the corresponding fields used in legacy devices 106 such as 802.11a/g/n/ac. The L-SIG field 206 may be transmitted using binary phase shift keying (BPSK) with R=½. In example embodiments, the short preamble format 200 may include more than one L-SIG field 206. In example embodiments, the L-SIG field 206 may be used to indicate whether the preamble is the short preamble format 200 or the long preamble format 300. For example, a length field of the L-SIG field 206 may indicate whether the preamble is the short preamble format 200 or the long preamble format 300. For example, a length field that has a length of 1 modulo 3 may indicate a short preamble format 200 and a length of 2 modulo 3 may indicate a long preamble format 300. In example embodiments the HEW device 104 may configure a HE packet to have a symbol after the L-SIG field 206 to indicate whether the preamble is the long preamble 300 or the short preamble 200. For example, a symbol after the L-SIG field 206 may have a rotation that indicates the type of preamble.

The HE-SIG-A field 208 may be K1 number of symbols long with each symbol having a duration of 4 μs. K1 may be one or more. The HE-SIG-B field 210 may be K2 symbols long with each symbol having a duration of 4 μs. K2 may be one or more. The HE-LTF field 212 may be a HE long training field. The HE-LTF field 212 may be a compressed HE-LTF field 212. In example embodiments, HE-LTF field 212 may be compressed by a factor of 2 or more. In example embodiments, the HE-LTF field 212 may be compressed by a 4× factor. The HE-LTF field 212 may be compressed to reduce overhead.

In example embodiments, the HE-LTF field 212 may be compressed by transmitting the HE-LTF field 212 only on certain (e.g., 4× symbols) subcarriers. For example, only on one subcarrier out of a group of four subcarriers for 4× compression, or only on one subcarrier out of a group of two subcarriers for 2× compression. The channel estimates for subcarriers that are nulled in the HE-LTF field 212 can be obtained via interpolation at the HEW device 104 that receives the HE-LTF field 212 that is compressed. The HEW device 104 that receives the HE-LTF field 212 that is compressed may be able to perform interpolation of channel estimates with only negligible performance differences because frequency selectively of indoor channels is limited.

In example embodiments, short preamble format 200 may be designed for indoor use. In example embodiments, the HEW device 104 may be configured to use the short preamble format 200 in a downlink transmission from an AP 102 to a HEW device 104 and not use the short preamble format 200 in an uplink transmission from the HEW device 104 to the AP 102.

In example embodiments, one or more of the HE-SIGs (e.g. HE-SIG-A 208 or HE-SIG-B 210) may be transmitted with longer GIs or with smaller sub-carrier spacing than that used in legacy devices 106 such as 802.11a/g/n/ac. For example, the sub-carrier spacing may be one-quarter that used by the legacy devices 106.

The legacy preamble 250 may include the L-STF 202, L-LTF 204, and L-SIG 206 and may be the same as a legacy preamble used by legacy devices 106 that operate in accordance with 802.11a/g. In example embodiments, the short preamble format 200 may be designed for indoor use. In example embodiments, the short preamble format 200 may be used both for indoor use and outdoor use.

FIG. 3 illustrates a long preamble format 300 in accordance with some embodiments. The long preamble format 300 may include L-STF 302, L-LTF 304, one or more L-SIGs 306, 308, one or more HE-SIGs 310, 312, 314, and a HE-LTF 316. The L-STF 302 may be the same or similar to L-STF 202. The L-LTF 304 may be the same or similar to L-LTF 204. The L-SIG 306 may be the same or similar to L-SIG 206. In some embodiments, the L-SIG 306 is duplicated one or more times. For example, L-SIG 308 may be an example of L-SIG 306 being duplicated. The L-SIG 308 may indicate whether the HE-SIG-A 310 may be the same or similar to HE-SIG-A 208. In example embodiments, the L-SIG field 206 may be used to indicate whether the preamble is the short preamble format 200 or the long preamble format 300.

In some embodiments, the HE-SIG-A 310 may be duplicated one or more times. For example, HE-SIG-A 312 may be a duplicate of HE-SIG-A 310. HE-SIG-A 310 may take K1 times 4 μs to transmit where K1 is the number of symbols in HE-SIG-A 310. HE-SIG-A 310 may be one or more symbols. In example embodiments, HE SIG-A 310 may be two symbols HE-SIG-A1 and HE-SIG-A2. In example embodiments, HE-SIG-A1 may be repeated. In example embodiments, HE-SIG-A1 and HE-SIG-A2 may both be repeated once or twice in time or frequency. The duration of HE-SIG-A may be 2×K1×4 μs if HE-SIG-A 310 is K1 symbols, which are repeated twice.

HE-SIG-B field 314 may be the same or similar to HE-SIG-B field 210. HE-SIG-A 310 and/or HE-SIG-B field 314 may be transmitted with longer guard intervals (GIs). HE-SIG-B field 314 may take K2 times 4.8 μs to transmit with the longer GIs of 1.6 μs where K2 is the number of symbols in HE-SIG-B field 314. One or more of the symbols in the HE-SIG-B field 314 may be repeated once or twice in time or in frequency. One HE-SIG-B field 314 may take 4.8 μs to transmit with 3.2 μs to transmit one symbol and 1.6 μs for longer GIs than HE-SIG-B field 210. HE-LTF field 316 may be the same or similar to HE-LTF field 212. In example embodiments, HE-LTF field 316 may be compressed. In example embodiments, the HE-LTF field 316 may be compress less than the HE-LTF 212 of the short preamble format 200. For example, if the HE-LTF 212 is compressed 4×, then the HE-LTF field 316 may not be compressed or compressed 2×.

In example embodiments, long preamble format 300 may be designed for outdoor use. In example embodiments, one or more of the HE-SIGs (e.g. HE-SIG-A 310, HE-SIG-A 312, and/or HE-SIG-B 314) may be transmitted with longer GIs or with smaller sub-carrier spacing than that used in legacy devices 106 such as 802.11a/g/n/ac. For example, the sub-carrier spacing may be one-quarter that used by the legacy devices 106. Some embodiments may use long preamble format in indoor scenarios.

In example embodiments, the AP 102 and/or HEW device 104 may be configured to use the short preamble format 200 indoors. For example, home routers may be configured to use only the short preamble 200.

In example embodiments, the short preamble format 200 has a shorter duration than the long preamble format 300. The HEW device 104 may be configured to determine whether the HEW device 104 is indoors or outdoors based on signal reception. The HEW device 104 may adapt by using the short preamble format 200 indoors and the long preamble format 300 outdoors.

In example embodiments, the HEW device 104 may be configured to use the long preamble format 300 in a downlink transmission from an AP 102 to a HEW device 104 and not use the long preamble format 300 in an uplink transmission from the HEW device 104 to the AP 102. In example embodiments, the HEW device 104 that receives the long preamble format 300 may combine repeated symbols HE SIG-A 310 and HE SIG-A 312 for improved performance.

FIG. 4 illustrates a legacy signal field (L-SIG) 400 in accordance with some embodiments. The L-SIG field 400 may include a rate field 402, reserved field 404, length field 406, parity field 408, and signal tail field 410. The rate field 402 may be 4 bits and may be a rate that indicates a rate in millions of bits per second. The reserved field 404 may be a reserved bit. The length field 406 may be 12 bits and may encode a number of bytes or orthogonal frequency-division multiplexing (OFDM) symbols in the embedded media access control (MAC) frame.

The length field 406 may be used as disclosed in conjunction with FIGS. 2 and 3 to indicate whether a long preamble format or a short preamble format is used in a HE packet. For example, a length field 406 of the L-SIG field 206 or L-SIG 306 may indicate whether the preamble is the short preamble format 200 or the long preamble format 300. For example, a length field 406 that has a length of 1 modulo 3 may indicate a short preamble format 200 and a length of 2 modulo 3 may indicate a long preamble format 300.

In example embodiments, the L-SIG field may be repeated to indicate whether the short preamble format 200 or the long preamble format 300 is being used. For example, the polarity of the repeated L-SIG field may indicate whether the preamble is the short preamble format 200 or the long preamble format 300. Other embodiments may insert another specific symbol after L-SIG; not necessary an exact repetition it, to indicate short preamble format vs. long preamble format.

The parity field 408 may be an even parity bit for the first 16 signal bits to provide an indication if the first 16 bits are corrupted. The signal tail 410 may be six 0 bits to unwind convolutional codes.

The rate field 402 of the L-SIG 606 may be set as a fixed and known value and the length field 406 of the L-SIG 400 may be set to a length that would defer legacy devices 106 beyond the transmission of the HEW device 104 transmission.

Figure 5:
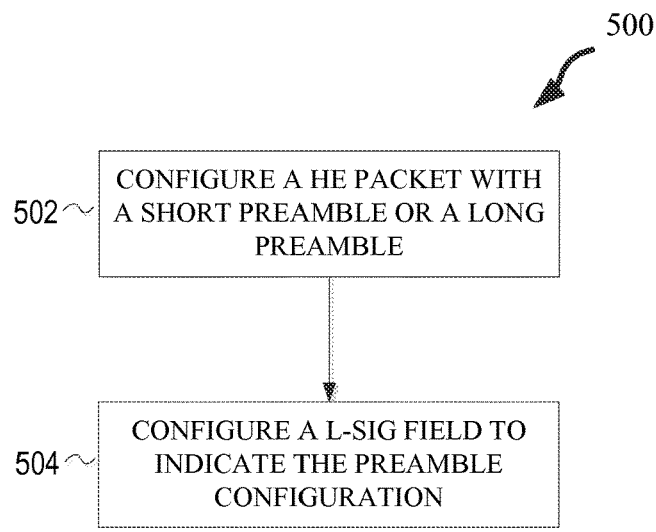
FIG. 5 illustrates a method for configuring a HE packet with either a short preamble format or a long preamble format in accordance with some embodiments.

FIG. 5 illustrates a method 500 for configuring a HE packet with either a short preamble format or a long preamble format in accordance with some embodiments. The method 500 may begin at operation 502 with configuring a HE packet with a short preamble or a long preamble. For example, a HEW device 104 and/or AP 102 may determine whether to use the short preamble format 200 or the long preamble format 300 based on characteristics of the wireless medium. For example a lot of errors may indicate that the long preamble format 300 should be used. The method 500 may continue at operation 504 with configure a L-SIG field to indicate the preamble configuration. For example, the HEW device 104 may indicate the preamble format based on the length of one or more L-SIG fields. For example, a length field of the L-SIG field that is 1 modulo 3 may indicate a short preamble format 200, and a length field of the L-SIG field that is 2 modulo 3 may indicate a long preamble format 300. The HEW device 104 may indicate the format of the preamble in other ways as described herein. The method 500 may end with the HEW device 104 transmitting the configured HE packet to another HEW device.

Figure 6:
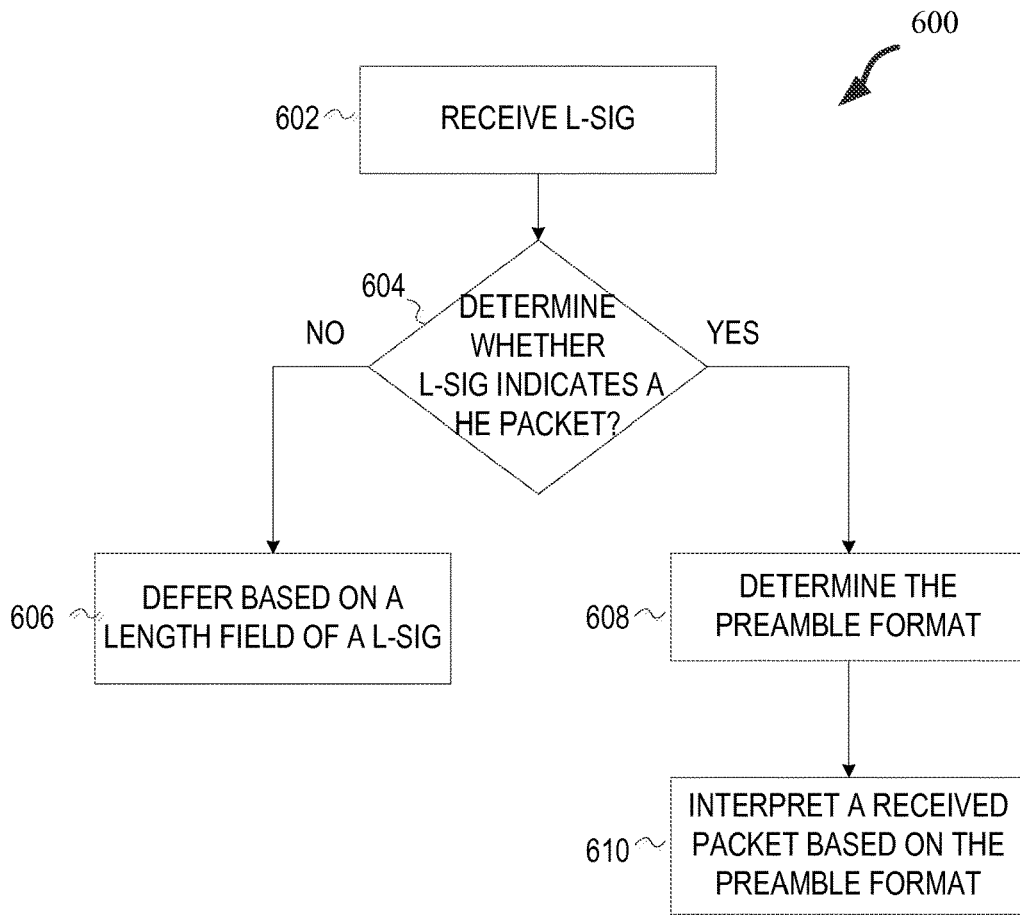
FIG. 6 illustrates a method for interpreting a HE packet in accordance with some embodiments.

FIG. 6 illustrates a method 600 for interpreting a HE packet in accordance with some embodiments. The method 600 may begin at operation 602 with receiving a L-SIG field. For example, A HEW device 104 may receive a HE packet with a short preamble format 200 or a long preamble format 300.

The method 600 may continue at operation 604 with determine whether L-SIG indicates a HE packet. The legacy devices 106 and HEW devices 104 co-exist in the same WLAN. The HEW device 104 needs a way to recognize HE packets and a way to indicate to legacy devices 106 to defer if the packet is HE packet. The HEW device 104 may be able to determine based on the L-SIG whether or not the packet may be a HE packet. For example, a length 406 field may indicate that the packet may be an HE packet if the length 406 field is not equal to 0 modulo 3. Moreover, there may be more than one L-SIG field and a rotation of another L-SIG field may indicate that the packet is an HE packet. Other methods such as one explained above enable of determining whether the preamble is the long preamble 300 or the short preamble 200. In example embodiments, the term auto-detect may be used to mean that the HEW device 104 determines whether there is a long preamble 300 or a short preamble 200 based on the received packet.

If the HEW device 104 can determine that the packet is not an HE packet from one or more L-SIGs, then the HEW device 104 may defer for a duration based on the length field 406 and a rate 402 field of the L-SIG 400, or alternatively, the HEW device 104 may interpret the packet according to a legacy standard such as 802.11a/g/n/ac.

Returning to 604, if the L-SIG indicates that the packet is or may be an HE packet then the method 600 continues at operation 608 with determining the preamble format. For example, the length 406 field of the L-SIG 400 may indicate based on the modulus 3 the preamble configuration. In another example, the polarity of a repeated L-SIG 400 may indicate the preamble configuration. In another example, a repetition of L-SIGs 400 may indicate the preamble configuration. For example, three L-SIGs 400 may indicate that the preamble is a long preamble format 300 and two L-SIGs 400 may indicate that the preamble is a short preamble format 200.

The method 600 may continue at operation 610 with interpret a received packet based on the preamble format. For example, the HEW device 104 may determine that the preamble format is the long preamble format 400 and interpret HE SIG-B 314 for longer GIs. This may improve the efficiency of the HEW device 104 to know which preamble format to interpret the received packet with. In example embodiments, the HEW device 104 may determine that the packet is not a HE packet after receiving the one or more L-SIGs. For example, a polarization of the next symbols after the L-SIGs may indicate that the packet is a legacy packet such as an 802.11/a/g/n/ac packet.

Example embodiments have the technical effect that by defining two preamble formats the wireless medium may be used more efficiently. In example embodiments, the short preamble 200 has less overhead and may be used indoors, but may be less reliable in some environments. In example embodiments the long preamble 300 may be used in the outdoors and may have more overhead but may be more reliable in some environments. The short preamble 200 may include a shorter duration of the LTF and/or non-repetition of SIGs. The outdoors may include a longer duration LTF and repetition of one or more SIG symbols.

Figure 7:
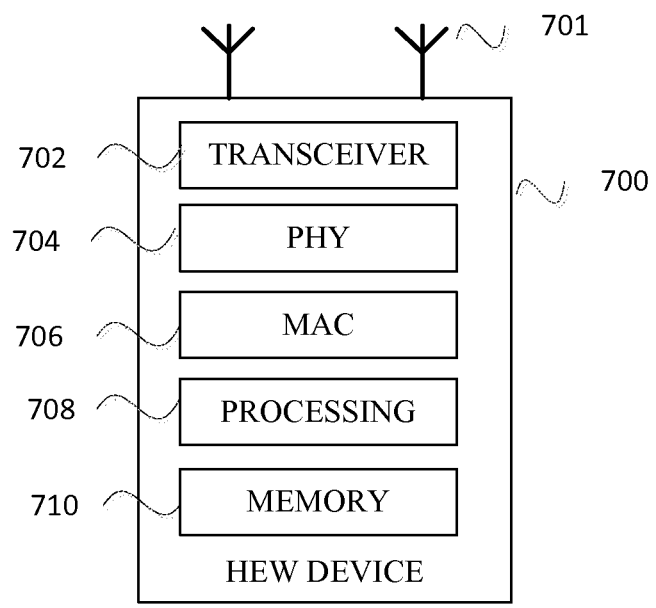
FIG. 7 illustrates a HEW device, in accordance with some embodiments.

FIG. 7 illustrates a HEW device, in accordance with some embodiments. HEW device 1200 may be an HEW compliant device that may be arranged to communicate with one or more other HEW devices, such as HEW devices 104 (FIG. 1), or AP 102 (FIG. 1), as well as communicate with legacy devices 106 (FIG. 1). HEW devices 104 and legacy devices 106 may also be referred to as HEW STAs and legacy STAs, respectively. HEW device 600 may be suitable for operating as AP 102 (FIG. 1) or an HEW device 104 (FIG. 1). In accordance with embodiments, HEW device 700 may include, among other things, a transmit/receive element (for example an antenna) 701, a transceiver 702, PHY 704 circuitry, and MAC 706 circuitry. PHY 704 and MAC 706 may be HEW compliant layers and may also be compliant with one or more legacy IEEE 802.11 standards. MAC 706 may be arranged to configure PHY layer convergence procedure (PLCP) protocol data units (PPDUs) and arranged to transmit and receive PPDUs, among other things. HEW device 700 may also include other hardware processing circuitry 708, and memory 710 may be configured to perform the various operations described herein. The processing circuitry 708 may be coupled to the transceiver 702, which may be coupled to the transmit/receive element 701. While FIG. 7 depicts the processing circuitry 708 and the transceiver 702 as separate components, the processing circuitry 708 and the transceiver 702 may be integrated together in an electronic package or chip.

In example embodiments, the HEW device 104 is configured to perform one or more of the functions and/or methods described herein such as the methods, apparatuses, and functions described in conjunction with FIGS. 2 through 10; and in particular to detecting HE-SIGs. The PHY 704 may include circuitry for modulation/demodulation, upconversion/downconversion, filtering, amplification, and the like. In some embodiments, the hardware processing circuitry 708 may include one or more processors. The hardware processing circuitry 708 may be configured to perform functions based on instructions being stored in a RAM or ROM, or based on special purpose circuitry. In some embodiments, the circuitry 708 may be configured to perform one or more of the functions described herein for configuring, transmitting, receiving, and interpreting HE packets with either a long preamble format 200 or a short preamble format 300.

In some embodiments, two or more antennas may be coupled to the PHY 704 and arranged for sending and receiving signals including transmission of the HEW packets. The HEW device 700 may include a transceiver 702 to transmit and receive data such as HEW PPDU and packets that include an indication that the HEW device 700 should adapt the channel contention settings according to settings included in the packet. The memory 710 may store information for configuring the other circuitry to perform operations for configuring and transmitting BAR and BA packets and performing the various operations described herein including sending and responding to BARs and BAs.

In some embodiments, the HEW device 700 may be configured to communicate using OFDM communication signals over a multicarrier communication channel. In some embodiments, HEW device 700 may be configured to communicate in accordance with one or more specific communication standards, such as the IEEE standards including IEEE 802.11-2012, 802.11n-2009, 802.11ac-2013, 802.11ax, standards and/or proposed specifications for WLANs, although the scope of the example embodiments is not limited in this respect as they may also be suitable to transmit and/or receive communications in accordance with other techniques and standards. In some embodiments, the HEW device 700 may use 4× symbol duration of 802.11n or 802.11ac.

In some embodiments, a HEW device 700 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an AP, a base station, a transmit/receive device for a wireless standard such as 802.11 or 802.16, or other device that may receive and/or transmit information wirelessly. In some embodiments, the mobile device may include one or more of a keyboard, a display, a non-volatile memory port, multiple antennas, a graphics processor, an application processor, speakers, and other mobile device elements. The display may be an liquid crystal display (LCD) screen including a touch screen.

The transmit/receive element 701 may comprise one or more directional or omnidirectional antennas, including, for example, dipole antennas, monopole antennas, patch antennas, loop antennas, microstrip antennas or other types of antennas suitable for transmission of radio-frequency (RF) signals. In some MIMO embodiments, the antennas may be effectively separated to take advantage of spatial diversity and the different channel characteristics that may result.

Although the device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The following examples pertain to further embodiments. Example 1 is a high-efficiency (HE) station including circuitry. The circuitry may be configured to generate a HE packet with a short preamble format or a long preamble format, wherein the HE packet comprises one or more legacy signal (L-SIG) fields followed by one or more HE signal fields (HE-SIG) and an HE long-training field (HE-LTF); and configure an indication in the HE packet to indicate whether the HE packet is configured with the short preamble format or the long preamble format.

In Example 2, the subject matter of Example 1 can optionally include where the one or more legacy signal fields (L-SIGs) indicate whether the HE packet is configured with the short preamble format or the long preamble format.

In Example 3, the subject matter of Example 1 can optionally include where a symbol after the one or more L-SIGs) indicates whether the HE packet is configured with the short preamble format or the long preamble format.

In Example 4, the subject matter of any of Examples 1-3 can optionally include where the circuitry is further configured to transmit the HE packet in a downlink transmission to a second HE station in accordance with the generated preamble format for communication in accordance with an orthogonal frequency division multiple access (OFDMA) technique in a transmission opportunity (TXOP).

In Example 5, the subject matter of any of Examples 1-4 can optionally include where for the short preamble format, the circuitry is to configure the fields for shorter-delay spread channels, and wherein for the long preamble format, the circuitry is to configure the fields for longer-delay spread channels.

In Example 6, the subject matter of Examples 1 and 5 can optionally include where a modulo 3 of a length field of one of the one or more (L-SIGs) is to indicate whether the HE packet is configured with the short preamble format or the long preamble format.

In Example 7, the subject matter of Example 6 can optionally include where the length field modulo 3=1 and the length field modulo 3=2 are each to indicate different ones of the following group: the short preamble format and the long preamble format.

In Example 8, the subject matter of any of Examples 1-7 can optionally include where for the short preamble format, the circuitry is to compress the HE-LTF in accordance with a compression factor of up to 4×, and wherein for the long preamble format, the circuitry is to configure the packet such that at least one of the L-SIG and the HE-SIG is repeated in the time-domain.

In Example 9, the subject matter of any of Examples 1-8 can optionally include where the circuitry is further configured to generate the HE packet in accordance with the long preamble format if a number of communication errors reaches a threshold.

In Example 10, the subject matter of any of Examples 1-9 can optionally include where the circuitry is further configured to generate the HE packet in accordance with the short preamble format for indoor usage and configured to generate the HE packet in accordance with the longer preamble format for outdoor usage.

In Example 11, the subject matter of Example 1 can optionally include where the HE-SIG comprises a HE-SIG-A, a HE-SIG-B1 and an HE-SIG-B2, and wherein for the long preamble format, the circuitry is to configure the packet such that the HE-SIG-A is repeated in a time domain and the HE-SIG-B1 is configured with a longer guard interval than the HE-SIG-B1 for the short preamble format.

In Example 12, the subject matter of Example 1 can optionally include where for the long preamble HE-SIG-A comprises SIG-A-A1 and SIG-A-A2 and wherein one or both of SIG-A-A1 and SIG-A-A2 are repeated.

In Example 13, the subject matter of Example 1 can optionally include where one from the following group: whether one or more of the L-SIG fields is repeated, a symbol after the L-SIG fields, a L-SIG polarity of a repeated L-SIG, or a length field of one of the one or more L-SIG fields, indicate whether the HE packet is configured with the short preamble format or the long preamble format.

In Example 14, the subject matter of any of Examples 1-13 can optionally include where for the long preamble format, the HE-LTF is to be either not compressed or compressed in accordance with a compression factor that is less than the compression factor used for compressing the HE-LTF for the short preamble format.

In Example 15, the subject matter of any of Examples 1-14 can optionally include circuitry; memory coupled to the circuitry; and one or more antennas coupled to the circuitry.

Example 16 is a method for communication performed by a high-efficiency (HE) station. The method may include generating a HE packet with a short preamble format or a long preamble format, where the HE packet comprises one or more legacy signal (L-SIG) fields followed by one or more HE signal fields (HE-SIG) and an HE long-training field (HE-LTF), and configuring the HE packet to indicate whether the HE packet is configured with the short preamble format or the long preamble format.

In Example 17, the subject matter of Example 16 can optionally include where the one or more legacy signal fields (L-SIGs) indicate whether the HE packet is configured with the short preamble format or the long preamble format.

In Example 18, the subject matter of Example 16 can optionally include where the length field modulo 3=1 and the length field modulo 3=2 each indicate different ones of the following group: the short preamble format and the long preamble format.

In Example 19, the subject matter of Example 16 can optionally include where one from the following group: whether one or more of the L-SIG fields is repeated, a symbol after the L-SIG fields, a L-SIG polarity of a repeated L-SIG, or a length field of one of the one or more L-SIG fields, indicate whether the HE packet is configured with the short preamble format or the long preamble format.

Example 20 is a high-efficiency (HE) station comprising circuitry. The circuitry may be configured to receive a HE packet with a short preamble format or a long preamble format, where the HE packet comprises one or more legacy signal fields (L-SIGs) followed by one or more HE signal fields (HE-SIG) and an HE long-training field (HE-LTF), and auto-detect whether the HE packet has the short preamble format or the long preamble format based on the HE packet.

In Example 21, the subject matter of Example 20 can optionally include where the circuitry is further configured to auto-detect whether the HE packet has the short preamble format or the long preamble format based on at least from the following group: whether one or more of the L-SIG fields is repeated, a L-SIG polarity of a repeated L-SIG, a symbol after the L-SIG fields, or a length field of one of the one or more L-SIG fields.

In Example 22, the subject matter of Example 20 can optionally include where the circuitry is further configured to auto-detect whether the HE packet has the short preamble format or the long preamble format based on a modulo 3 of a length field of one of the one or more L-SIGs.

In Example 23, the subject matter of any of Examples 20-22 can optionally include memory and one or more antennas coupled to the circuitry.

Example 24 is a non-transitory computer-readable storage medium that stores instructions for execution by one or more processors to perform operations for communication by a wireless communication device. The instructions to configure the one or more processors to cause the wireless communication device to: configure a HE packet with a short preamble format or a long preamble format, where the HE packet comprises one or more legacy signal (L-SIG) fields followed by one or more HE signal fields (HE-SIG) and an HE long-training field (HE-LTF), and configure the one or more legacy signal fields (L-SIGs) to indicate whether the HE packet is configured with the short preamble format or the long preamble format.

In Example 25, the subject matter of Example 24 can optionally include where the instructions further configure the one or more processors to cause the wireless communication device to: configure the one or more legacy signal fields (L-SIGs) to indicate whether the HE packet is configured with the short preamble format or the long preamble format based on a modulo 3 of a length field of one of the one or more (L-SIGs).

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus comprising: memory; and, processing circuitry coupled to the memory, the processing circuitry configured to:
    encode a preamble for high-efficiency (HE) Physical Layer Convergence Protocol (PLCP) Protocol Data Unit (PPDU), the preamble comprising a legacy portion comprising a legacy signal (L-SIG) field, the L-SIG field comprising a length field, wherein a modulo 3 of a value of the length field equal to 0 indicates the preamble does not comprise a HE preamble portion, and further encode the preamble to comprise a repeat L-SIG field after the L-SIG field with a same symbol rotation as the L-SIG to indicate the preamble comprises the HE preamble portion, wherein the modulo 3 of the value of the length field equal to 2 indicates a first HE-SIG-A format or a second HE-SIG-A format, wherein a rotation of a symbol after the L-SIG field indicates the first HE-SIG-A format or the second HE-SIG-A format, and wherein the first HE-SIG-A format comprises a first two symbols and a repeat of the first two symbols, and the second HE-SIG-A format comprises a second two symbols;
    if the rotation of the symbol after the L-SIG field indicates the second HE-SIG-A format, encode the HE preamble portion to comprise a HE-SIG-A field having a duration of 8 μs and to further comprise a HE-SIG-B field with a number of symbols, wherein the number of symbols is variable; and
    configure the HE PPDU, to include the preamble, for transmission by a wireless device.

2. The apparatus of claim 1, wherein the processing circuitry is further configured to:

if the L-SIG field indicates the first HE SIG A format, encode the HE preamble portion to comprise a HE-SIG-A1, a repeat HE-SIG-A1, a HE-SIG-A2, and a repeat HE-SIG-A2.

3. The apparatus of claim 2, wherein the processing circuitry is further configured to:
if the L-SIG field indicates the first HE-SIG-A format, encode the HE preamble portion to comprise the HE-SIG-A having a duration of 8 μs.

4. The apparatus of claim 1, wherein the first HE-SIG-A format is for outdoor use.

5. The apparatus of claim 1, wherein the wireless device is an Institute of Electrical and Electronic Engineers (IEEE) 802.11 ax access point or an IEEE 802.11 ax station.

6. The apparatus of claim 1, wherein the length field is 12 bits.

7. The apparatus of claim 1, further comprising transceiver circuitry coupled to the processing circuitry.

8. The apparatus of claim 7, further comprising one or more antennas coupled to the transceiver circuitry.

9. The apparatus of claim 1, wherein a modulo 3 of a value of the length field equal to 1 or equal to 2 indicates the preamble comprises a HE preamble portion.

10. A method performed by an apparatus, the method comprising:
encoding a preamble for high-efficiency (HE) Physical Layer Convergence Protocol (PLCP) Protocol Data Unit (PPDU), the preamble comprising a legacy portion comprising a legacy signal (L-SIG) field, the L-SIG field comprising a length field, wherein a modulo 3 of a value of the length field equal to 0 indicates the preamble does not comprise a HE preamble portion, and further encode the preamble to comprise a repeat L-SIG after the L-SIG field with a same symbol rotation as the L-SIG to indicate the preamble comprises the HE preamble portion, wherein the modulo 3 of the value of the length field equal to 2 indicates a first HE-SIG-A format or a second HE-SIG-A format, wherein a rotation of a symbol after the L-SIG field indicates the first HE-SIG-A format or the second HE-SIG-A format, and wherein the first HE-SIG-A format comprises a first two symbols and a repeat of the first two symbols, and the second HE-SIG-A format comprises a second two symbols;
if the rotation of the symbol after the L-SIG field indicates the second HE-SIG-A format, encode the HE preamble portion to comprise a HE-SIG-A field having a duration of 8 μs and to further comprise a HE-SIG-B field with a number of symbols, wherein the number of symbols is variable; and
configuring the HE PPDU, to include the preamble, for transmission by a wireless device.

11. The method of claim 10, the method further comprising:
if the one or more L-SIG fields indicate the first HE SIG A format, encoding the HE preamble portion to comprise a HE-SIG-A1, a repeat HE-SIG-A1, a HE-SIG-A2, and a repeat HE-SIG-A2.

12. An apparatus comprising: memory; and processing circuitry coupled to the memory, the processing circuitry configured to:
decode a preamble for a high-efficiency (HE) Physical Layer Convergence Protocol (PLCP) Protocol Data Unit (PPDU), the preamble comprising a legacy portion comprising a signal (L-SIG) field, the L-SIG field comprising a length field, wherein a modulo 3 of a value of the length field equal to 1 or equal to 2 indicates the PPDU is a HE PPDU, and the preamble further comprising a repeat L-SIG after the L-SIG field, wherein a same symbol rotation of the repeat L-SIG as the L-SIG indicates the PPDU is the HE PPDU,
if a rotation of a symbol after the L-SIG field indicates the first HE-SIG-A format, decode the HE preamble portion, wherein the HE preamble portion comprises a HE-SIG-A and a repeated HE-SIG-A, and wherein the repeated HE-SIG-A is to be a repeat of the HE-SIG-A in time;
if the rotation of the symbol after the L-SIG field indicates the second HE-SIG-A format, decode the HE preamble portion to comprise a HE-SIG-A field having a duration of 8 μs and to further comprise a HE-SIG-B field with K2 symbols, wherein K2 is variable; and
if the rotation of the symbol after the L-SIG field indicates the second HE SIG A format, decode the HE preamble portion, wherein the HE preamble portion comprises a single instance of the HE-SIG-A.

13. The apparatus of claim 12, further comprising transceiver circuitry coupled to the processing circuitry; and, one or more antennas coupled to the transceiver circuitry.

* * * * *